J. D. ALLEN.
GEARING.
APPLICATION FILED APR. 26, 1916.
1,262,901.
Patented Apr. 16, 1918.
2 SHEETS—SHEET 2.
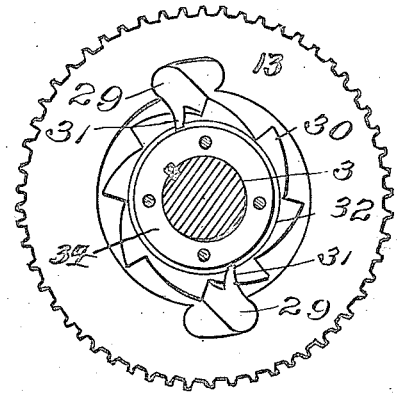
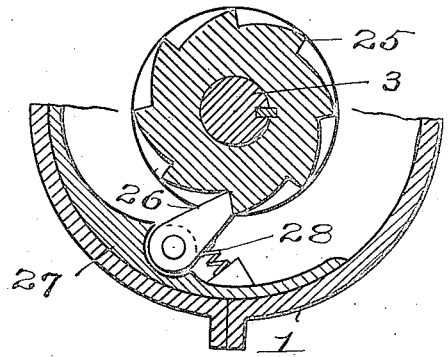
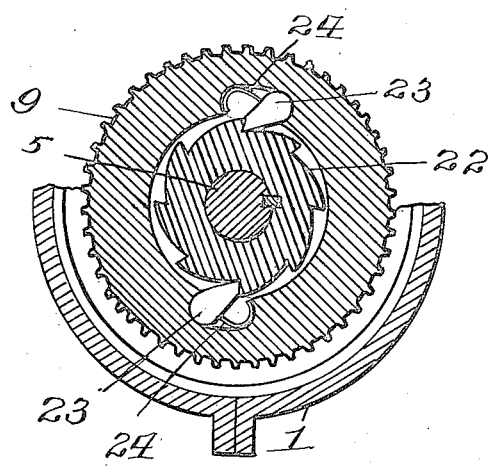
Inventor
John D. Allen
By Howard A. Coombs
his Attorney

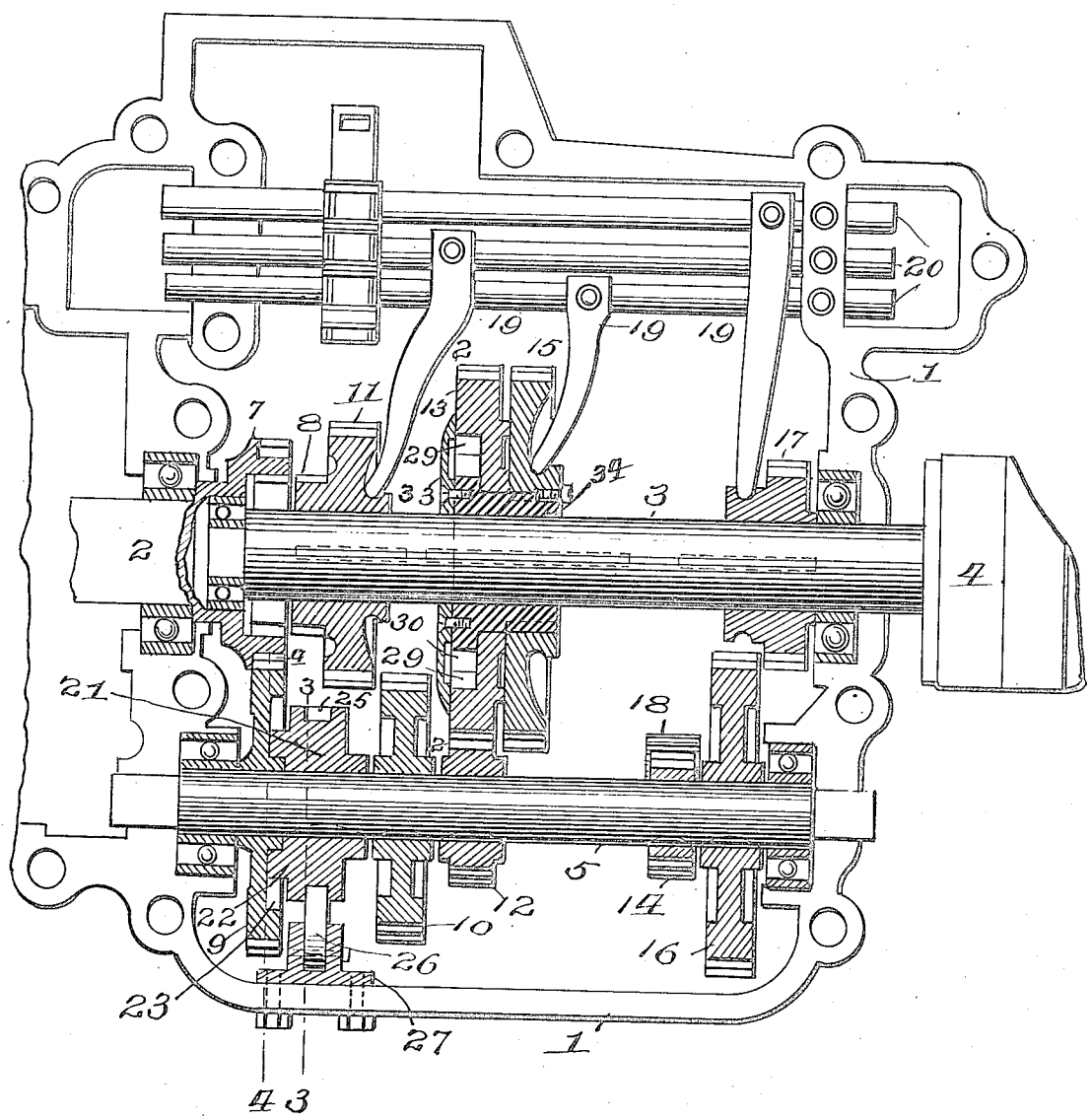

UNITED STATES PATENT OFFICE.

JOHN D. ALLEN, OF PHILADELPHIA, PENNSYLVANIA.

GEARING.

1,262,901.

Specification of Letters Patent.

Patented Apr. 16, 1918.

Application filed April 26, 1916. Serial No. 93,646.

*To all whom it may concern:*

Be it known that I, JOHN D. ALLEN, a citizen of the United States, residing at Philadelphia, in the county of Philadelphia and State of Pennsylvania, have invented new and useful Improvements in Gearing, of which the following is a specification.

This invention relates to change-speed gear transmissions through which power is transmitted to raise a load, and its object is to prevent the load from falling or running backwardly, should the power fail at any time when a load is being raised and the brakes fail to hold.

More particularly stated, the invention resides in certain improvements in change speed gearing, of the interchangeable sliding gear or clutch type, by means of which the driven shaft cannot be rotated backwardly, by the load, even when the gears are being shifted from one speed to another. It was especially devised for use in motor vehicles, for the purpose of obviating all danger of the driver losing control and the car running backwardly down a hill, when the motor stalls and the brakes prove insufficient to hold the car. Many serious accidents and narrow escapes have occurred under such circumstances, as is well known.

In all change speed gear transmissions used today in motor vehicles, as far as this applicant is aware, all the gear pairs must be out of mesh, or in neutral, at the time of every shift from one speed to another, so that even if the driving shaft were prevented from turning backward, the driven shaft would not be, because it must be disconnected therefrom in shifting the gears from one speed ratio to another and, if the motor stalls when the car is ascending a hill on the second speed, for example, the driver has to shift the gears into low speed before he can start up again, in doing which he has first to disconnect the second speed gears, at which time the car may start to move backwardly, if the brakes do not hold, and he would then be unable to throw in the low speed. An essential feature of my invention, therefore, is the provision of means to always maintain a positive connection between the driving shaft and the driven shaft during all the shifts from one forward speed to another, in combination with means to prevent any backward rotation of the driving shaft. This latter means is useful by itself when used with the ordinary sliding gear transmission, as it will serve to hold the car from running backward as long as one pair of gears for forward drive is in mesh, but the full advantage of my invention is not attained unless both means are used in combination.

Another feature of my invention is the combination, with the means for preventing the intermediate or driving shaft from turning backwardly, of a pawl-and-ratchet connection between said shaft and the engine shaft, the object of which is to obviate any danger of breakage should the engine shaft be reversed accidentally, as when an internal combustion engine back-fires. In this description and in the claims I use the expression "turning backwardly" in connection with both the driving and driven shafts, although, of course, said shafts turn normally in opposite directions. The term "backwardly" means in such a direction as would allow the load or vehicle to move backwardly or downwardly.

The invention is illustrated, as applied to an automobile transmission, in the accompanying drawings, in which, Figure 1 is a sectional plan view of a sliding gear transmission equipped with my invention, and Figs. 2, 3 and 4 are sections on lines 2—2, 3—3, and 4—4, respectively, of Fig. 1.

In these views, referring to Fig. 1, 1 represents the lower half of the transmission gear casing of a motor vehicle, 2 the clutch or engine shaft, 3 the main or driven shaft, 4 the universal joint connecting shaft 3 to the differential, and 5 the countershaft or intermediate driving shaft.

It will be understood that, for the purposes of my invention, the countershaft 5 may be considered as the driving shaft, it being immaterial whether the power is applied directly to it or through gearing as shown. In the description, I will refer to said shaft 5 as the countershaft, but since it is the shaft which transmits the power to the driven shaft, it is in effect the driving shaft, as far as my invention is concerned, and will be so denominated in certain of the claims. This application is a continuation, in part, of my prior application Serial No. 51430, filed September 18, 1915.

In the embodiment of the invention illustrated, said shaft 5 receives its drive from the clutch shaft 2 through gear 7, fast on the latter, and gear 9, loose on shaft 5. As usual, gear 7 can be clutched to shaft 3 by means of clutch 8, for direct drive; gears 10, 12, 14, and 16 are fast on shaft 5, and gears 11, 13, 15 and 17 are slidably mounted on shaft 3, all but 13 being keyed thereon. The low-speed forward is transmitted through pinion 12 and gear 13, the second speed through gears 10 and 11, the third speed through gears 16 and 17, and the reverse drive through pinion 14, gear 15, and intermediate pinion 18, which, as usual, is mounted on a jack shaft (not shown) in the lower part of the gear casing. 19 represents the shifter arms and 20 the shifter bars carrying said arms and operated by the gear-shifting lever (not shown) in the usual way.

The safety stop, to automatically prevent backward rotation of the countershaft 5, comprises coöperating means of the pawl-and-ratchet type, applied between the gear 9 and the gear casing 1, respectively. This connection might be made direct, that is, a ratchet wheel might be secured to the casing (or the gear) and a coöperating pawl or pawls be carried by the gear (or the casing), but I have found such an arrangement to be objectionable because it does not leave gear 9 free to turn backwardly in case the engine back-fires, and something is very likely to be broken in that case. I therefore make the connection through two pawl-and-ratchet mechanisms, one connecting a member, fast on the intermediate shaft, to the casing, and the other connecting the gear 9 to said member. The latter is shown at 21 and it has a ratchet-wheel shaped extension 22, lying within a recess in the face of gear 9, the latter having a pair of pawls 23, seated in sockets in its face in position to engage the teeth of the wheel 22 and pressed toward them by springs 24. In the periphery of member 21 is formed another set of ratchet teeth 25, facing the same way as the teeth of 22, and a pawl 26 is pivoted in a bracket 27, bolted to the inside of the casing 1, in position to engage said teeth 25 and pressed toward them by a spring 28. When gear 9 is driving, it is turning to the left in Fig. 4 and carries member 21 and shaft 5 with it. At this time, pawl 26 slips over teeth 25. If the load on shaft 5 tends to turn it backwardly, pawl 26 prevents it from doing so, but gear 9 is free to turn backwardly, to the right in Fig. 4, should the engine back-fire.

This construction, therefore, will effectually prevent the car running backward down a hill, as long as one of the coöperating pairs of gears on the countershaft and main or driven shaft is in mesh. But, with an ordinary transmission, should the brakes not hold and the driver shift gears, in order to go into low gear, for example, it would be necessary to pass through one or more neutral points, whereby he might lose control of the car, for which reason I provide the means, above referred to and now to be described, for maintaining a positive connection between the shafts while the gears are being shifted between any of the forward speeds.

In place of the usual single low-speed and reverse gear on the driven shaft, I provide a double gear, or rather two gears, slidable as one on shaft 3, one of which 15 is for the reverse drive and the other 13 is for the low-speed forward drive. These gears are mounted on the hub 34 of a ratchet wheel 30, which is keyed to the shaft. Gear 13 turns loosely on said hub and has a recess in its face to receive the wheel 30. Gear 15 is keyed or otherwise rigidly secured to hub 34. Two pawls 29 are mounted in sockets in the face of the gear 13 in position to engage the teeth of the wheel 30.

The low-speed forward drive is through said pawls and ratchet wheel, but when one of the higher speeds is thrown in, shaft 3, of course, runs faster than gear 13, which continues to be driven by low-speed pinion 12, and in order to prevent the pawls from clicking over the ratchet teeth, I provide the following means:

Pawls 29 are each provided with an arm 31, the end of which lies in a recess formed in a wire ring 32, frictionally mounted in a groove formed adjacent the ratchet wheel 30. It will be seen that, as soon as shaft 3 and the ratchet wheel are driven faster than gear 13, one end of the recesses in the ring 32, pressing against one side of the arms 31, will raise the pawls 29 clear of the teeth and hold them there as long as the ratchet wheel runs faster than the gear, the ring slipping in its groove, but as soon as the speed of the ratchet wheel is reduced slightly below that of the gear, the reverse action takes place, i. e., the other ends of the recesses press against the other side of the arm 31, and the pawls 29 are thrown down into engagement with the teeth.

The gear 15 corresponds to the usual single low-speed and reverse gear of transmissions of this type, and the gear 13 is in auxiliary gear which is always in mesh with the low-speed pinion 12 when the gear 15 is in the neutral position. With the space between pinions 12 and 14 of the width shown in Fig. 1, both gears 15 and 13 can be disengaged at once, which is a convenience when it is necessary to push the car around by hand, but is not essential to my invention. The position of gear 15 shown corresponds to the neutral position of the ordinary low-speed and reverse gear but, of course, gear 15 is never shifted into mesh with pinion 12, with which gear 13 is always in mesh on forward drive, but only into mesh with intermediate reverse pinion 18. There are, therefore, only three positions into which the gear 15 has to be shifted by its arm 19 and bar 20, just as there are three positions into which the usual single low-speed and reverse gear has to be shifted. It is immaterial, however, if the space between pinions 12 and 14 is only of the usual width, allowing gear 15 to be out of mesh when gear 13 is in mesh but not of both gears being out of mesh at once.

It will be seen that the low speed gear 13 does not have a neutral position, (except on reverse drive), that is to say, it does not have to be disengaged from its driving pinion 12 in order to shift into or out of a higher speed. With pinion 12 and gear 13 always in mesh, (on all forward speeds), and with the safety stop, 25, 26, applied to the countershaft, the machine is always positively locked against running backward under the influence of the load. As applied to automobiles, therefore, the vehicle cannot run away backward down a hill, when the engine stalls and the brakes do not hold. The engine can then be started again and the low speed gear is already in, ready to start up the hill again. 33 represents a disk inclosing the pawls 29 and ratchet 30 to keep out the grease, and secured to the hub of the gear 15.

Having thus described my invention, what I claim is:—

1. A change-speed gearing comprising a driving shaft and a driven shaft, coöperating pairs of gears of different speed ratios on said shafts, means to render one pair operative at a time, means to maintain a positive connection between said shafts when changing speed, and automatic means to positively prevent backward rotation of the driving shaft.

2. A change-speed gearing comprising a driving shaft and a driven shaft, coöperating pairs of gears of different speed ratios on said shafts, means to render one pair operative at a time, means to maintain a positive connection between said shafts when changing speed and a pawl-and-ratchet connection between said driving shaft and a fixed part to prevent backward rotation of said driving shaft.

3. A change-speed gearing comprising a driving shaft and a driven shaft, coöperating pairs of gears of different speed ratios on said shafts, means to render one pair operative at a time, one of the gears of the pair, which transmits the loweset speed to the driven shaft, having a pawl-and-ratchet connection with its shaft, whereby said pair can be left in mesh while any one of the higher speed pairs is rendered operative, and means to positively prevent backward rotation of the driving shaft.

4. In a change-speed gearing in which the power is transmitted to the driven shaft through pairs of gears of different ratios mounted on said shaft and on a driving or counter shaft respectively, and one of said pairs of gears reverses the direction of rotation of the driven shaft by means of an intermediate gear, the combination, with said shaft and gears, of means to permit that pair of gears which transmits the lowest forward speed to the driven shaft, to be kept permanently in mesh, except when the reverse gear is used, and means to prevent backward rotation of said driving shaft.

5. In a change-speed gearing, the combination with the driving countershaft, the gears of different diameter fast thereon, the driven shaft and the gears of different diameter slidably mounted thereon to mesh with the gears on the driving shaft, of a pawl-and-ratchet connection between the largest gear on the driven shaft and the latter, whereby it can be left in mesh with its coöperating gear on the driving shaft while any one of the smaller gears on the driven shaft is connected with its coöperating gear on the driving shaft, and positive means to prevent backward rotation of the driving shaft.

6. In a change-speed gearing, the combination of a driving shaft and a driven shaft, gear pairs of different ratios on said shafts and means to render one pair operative at a time, a low-speed pinion and a reverse-pinion on said driving shaft, an intermediate pinion in mesh with said reverse pinion, a ratchet-wheel slidably keyed on said driven shaft, a gear rigidly connected therewith and adapted to be slid in mesh with said intermediate pinion, a loose gear mounted adjacent said gear and ratchet-wheel and connected to slide therewith, a pawl carried by said loose gear in position to engage the teeth of said wheel, means to maintain said pawl out of engagement with said teeth when the driven shaft is running faster than said loose gear, and means to positively prevent backward rotation of said driving shaft.

7. A change-speed gearing, comprising a driving shaft, an intermediate shaft, and a driven shaft, coöperating pairs of gears carried by said intermediate and driven shafts respectively, means to render one of said pairs operative at a time, means to maintain a positive connection between said two shafts at all times, means to positively prevent backward rotation of said intermediate shaft, a gear fast on said driving shaft, a gear in mesh therewith, loose on said intermediate shaft, and a pawl-and-ratchet connection between said loose gear and the intermediate shaft, whereby said loose gear can rotate in either direction, but neither said driven shaft nor said intermediate shaft can be rotated backwardly by said loose gear or by the load on said driven shaft.

8. In a transmission gearing, the combination with a load shaft, a driving shaft, and gear connections between said shafts, of a gear loose on said driving shaft, means to rotate said gear in either direction, a pawl-and-ratchet connection between said loose gear and its shaft, and means to prevent said driving shaft from rotating in one direction, whereby said load shaft cannot be rotated backwardly by the load thereon or by said loose gear.

9. In a transmission gearing, the combination with a load shaft, a driving shaft, and a reversible source of power, of connections between the latter and said driving shaft such that the latter can only be driven in one direction by the former, change-speed gears connecting said shafts, means to maintain a positive connection between said shafts while changing speeds, additional gear connections between said shafts for reversing the load shaft, and means to prevent backward rotation of said driving shaft.

10. In a transmission gearing, the combination of a driving shaft and a driven shaft, a loose gear on the latter and a gear, fast on the former, in mesh therewith, a member fast on the driven shaft and having two sets of ratchet-teeth facing in the same direction, a pawl carried by said loose gear in position to engage one of said sets of teeth to thereby drive said driven shaft, and a pawl carried by a fixed part in position to engage the other of said sets of teeth to thereby prevent backward rotation of said driven shaft, whereby said loose gear is free to turn backwardly without affecting said driven shaft.

11. In a transmission gearing, the combination of a shaft, a gear loose thereon, a pawl carried by said gear, a ratchet fast on said shaft to be engaged by said pawl, a similar ratchet also fast on said shaft, a pawl carried by a fixed part to engage said second ratchet, and means to rotate said gear in either direction, whereby said shaft is driven in one direction by said gear but cannot turn in the reverse direction.

12. In a transmission gearing, the combination with a shaft to be driven, of a driving shaft connected to a reversible source of power, means to prevent said driving shaft from turning in one direction, alternative connections between said shafts for varying the speed of the driven shaft, means to maintain a positive connection between said shafts while changing said alternative connections, and means to cause said driven shaft to be rotated in the other direction by said driving shaft.

13. In a change-speed gearing, the combination with driving and driven shafts, of a pair of pinions fast on the driving shaft, an intermediate pinion in mesh with one of said pair of pinions, a gear fast on the driven shaft and means to slide it into mesh with said intermediate pinion, a gear loose on said driven shaft but connected to slide with said fast gear, a pawl-and-ratchet connection between said loose gear and the driven shaft, said loose gear being in mesh with the other of said pair of pinions at all times except when it and said fast gear are slid along the shaft toward said intermediate pinion, other gear pairs of different diameters fast on said shafts, means to put said gear pairs in mesh alternatively, and means to prevent backward rotation of said driving shaft, whereby the load on the driven shaft cannot turn said shaft backwardly when the power is cut off as long as said loose gear is in mesh with its pinion but the driven shaft can be driven backwardly by the driving shaft.

14. A transmission gearing for motor vehicles, comprising the combination, with a power shaft, a driven shaft, and a countershaft, of means to prevent the latter from turning in one direction, a gear on the power shaft, an intermeshing gear on the countershaft, other gears of different diameters on the latter, and intermeshing gears slidably mounted on the driven shaft, one of said gears having a pawl and ratchet connection with its shaft, whereby said shafts are always maintained in operative connection.

In testimony whereof I have hereunto set my hand.

JOHN D. ALLEN.